United States Patent [19]
Klingberg

[11] Patent Number: 5,357,516
[45] Date of Patent: Oct. 18, 1994

[54] APPARATUS FOR USE IN TIME DIVISION MULTIPLEXED COMMUNICATION SYSTEMS

[75] Inventor: Jeffrey W. Klingberg, Ft. Worth, Tex.

[73] Assignee: Motorola, Inc., Schaumburg, Ill.

[21] Appl. No.: 857,147

[22] Filed: Mar. 25, 1992

[51] Int. Cl.$^5$ .................................... H04B 7/212
[52] U.S. Cl. ........................... 370/118; 370/95.3; 375/122
[58] Field of Search .............. 370/24, 29, 77, 109, 370/110.1, 95.3, 61, 108, 110.2, 118; 375/7, 8, 122; 381/34; 358/426; 365/189.01, 189.04, 221, 189.12, 230.03, 239, 240

[56] References Cited
U.S. PATENT DOCUMENTS 4,161,629  7/1979  van Heyningen ............... 370/109
4,623,922  11/1986 Wischermann ..................... 381/34
5,111,454  5/1992  Hung et al. ........................ 370/109
5,121,387  6/1992  Gerhardt et al. ................ 370/85.2
5,166,930  11/1992 Braff et al. ...................... 370/85.2

Primary Examiner—Benedict V. Safourek
Attorney, Agent, or Firm—Raymond J. Warren; Kevin A. Buford

[57] ABSTRACT

The system consists of a receiver which receives an input signal and first and second compressors. The compressors compress first and second portions of the input signal forming first and second compressed signals. A storage device is provided to store the compressed signals and a transfer device for directing the storage of the first and second compressed signals in first and second time slot areas of the storage device. A controller is used to sequentially read the first and second time slot areas of the storage device thereby forming a serial signal which is then transmitted by a transmitter.

18 Claims, 2 Drawing Sheets

APPARATUS FOR USE IN TIME DIVISION MULTIPLEXED COMMUNICATION SYSTEMS

FIELD OF THE INVENTION

The present invention relates, in general, to communication systems and, more particularly, to a method and apparatus for use in time division multiplexed (TDM) communications systems.

BACKGROUND OF THE INVENTION

In time division multiplexed (TDM) communication systems, data is transmitted in a frame having a plurality of time slots. The data in each time slot is typically destined for separate receivers. The key to operating a TDM type of system is maintaining the proper timing of data in one time slot with respect to the frame and other time slots.

Presently, much of the timing operation is handled through the use of ASIC (Application Specific Integrated Circuits) devices. Their method of operation typically consists of receiving and storing the data to be transmitted in the various time slots. When a transmission frame begins, the ASIC will delay transmission of the data giving the receiver time to ramp up its power. This ramp up does not take long and the delay is only equivalent to a few bits. After the ramp up delay, a synchronization word is transmitted which will contain information such as the system identification (i.e. color code). Following the synchronization word, the first voice data is transmitted. At the end of the voice data, the ASIC delays a second data transmission to provide spacing between data in adjacent time slots. The process repeats itself for second, third, etc. time slots until the last time slot is reached. The frame will then repeat, if operating in a duplex configuration, or may be delayed for a receive cycle in a TDD (Time Division Duplex) system where transmit and receive occur on the same frequency.

Using the above means, the controller of the system is required to spend much of its processing ability in maintaining the timing of the transmission of data bits and retrieving the appropriate data bits at the desired time. Therefore, there is a need for a device which will free up processing functions and maintain the critical timing required to operate a TDM communication system.

SUMMARY OF THE INVENTION

The present invention provides a communication system comprising first and second storage means and a serial direct memory access means. A first communication signal is stored in the first storage means and a second communication signal is stored in the second storage means. The serial direct memory access means then forms a combined signal by serially accessing the first and second communication signals. The combined signal is then transmitted by a transceiver.

DETAILED DESCRIPTION OF THE DRAWINGS

Figure 1:
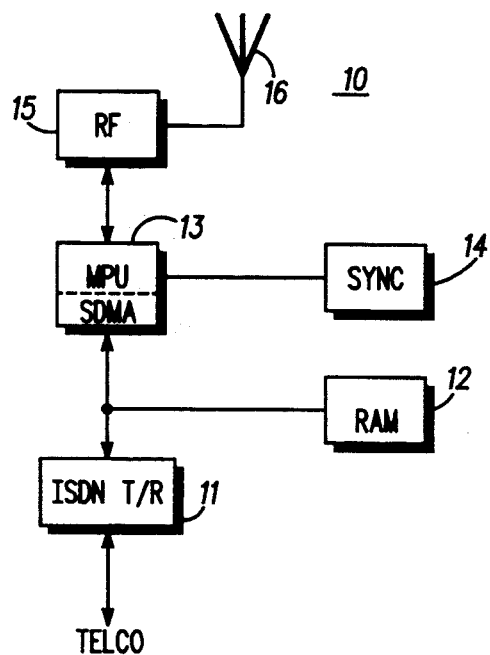
FIG. 1 is a general block diagram of a communication system embodying the present invention.
Figure 2:
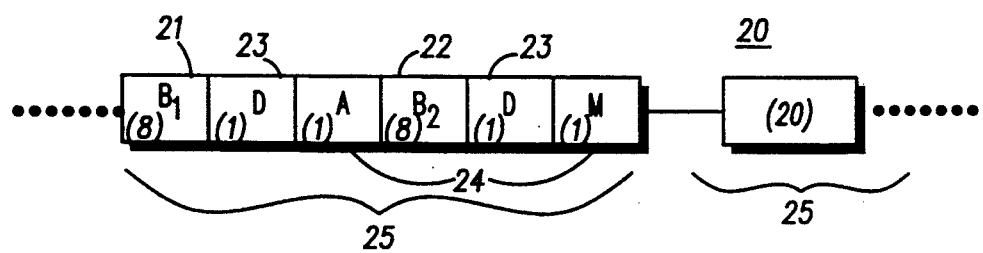
FIG. 2 is a block diagram of an interchip digital link (IDL) formatted signal.

Referring initially to FIG. 1, a general block diagram 10 embodying the present invention is illustrated. Diagram 10 has an input from a telephone company (TELCO) coupled to an integrated services digital network (ISDN) transceiver 11. An ISDN formatted data stream is received and converted into an interchip digital link (IDL) formatted signal 20, such as illustrated in FIG. 2. In this preferred embodiment, signal 20 consists of two B signals (21 and 22) and a D signal (23) each separated from the others by some filler data (24). The entire frame 25 is 20 bits long with B1 and B2 each having eight bits and D having two bits. The remaining two bits are used as filler 24.

Figure 5:
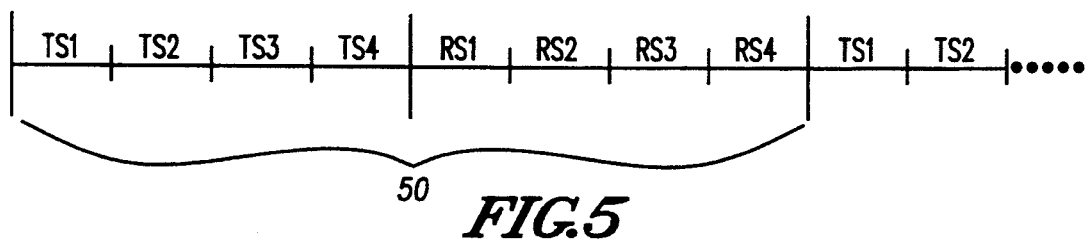
FIG. 5 is a waveform illustrating a frame of a communication signal.

Signal 20 is processed, as will be discussed more fully below in conjunction with FIG. 5, and stored in RAM 12. It should be noted here that other forms of storage (i.e. SRAM, DRAM, etc.) can be used in place of RAM 12 or that RAM 12 may be a portion of microprocessing unit (MPU) 13. The data from the input signal is stored by direct memory access in memory 12 as illustrated in the memory block diagram 30 of FIG. 3.

Figure 3:
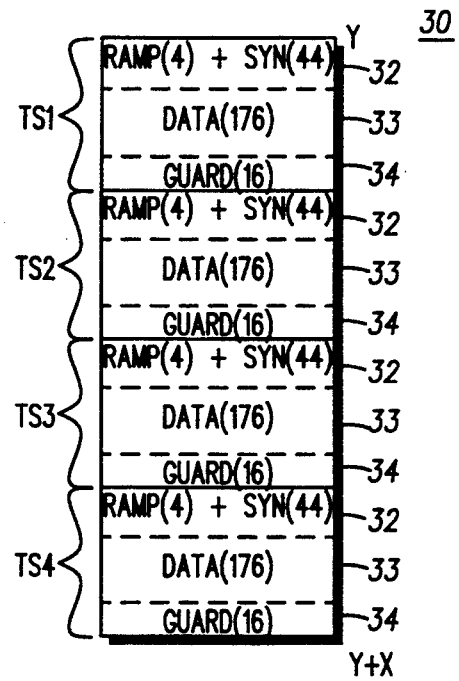
FIG. 3 is a block diagram representing a memory storage area utilized in the present invention.

As shown in FIG. 3, memory block 30 is divided into four time slots (TS1-TS4). Each time slot is divided into three areas 32-34. Sections 32 contain four ramp bits and 44 synchronization word bits. Section 33 contains the data from one of the B inputs. While only two B inputs are demonstrated in FIG. 1, the more detailed device of FIG. 6 will illustrate the use of four communication signals. Finally, section 33 contains 16 guard bits.

Figure 4:
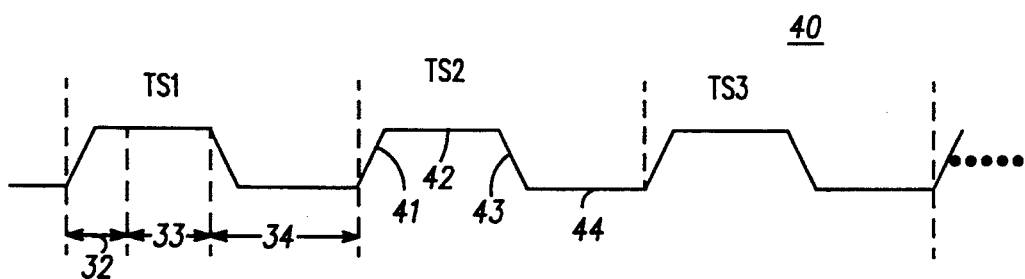
FIG. 4 is a waveform illustrating a time slot of communication signal.

A waveform 40 representing a communication signal having the above described sections is illustrated in FIG. 4. Waveform 40 shows three of the time slots TS1-TS3. Each of the time slots consists of a ramp 41, followed by a useable data portion 42. Data portion 42 contains the synchronization word and the voice data portion. Data portion 42 is followed by a downward ramp 43 and a non-data area 44. Areas 43 and 44 make-up the guard bits.

The time slots of FIG. 4 are coupled together in time to form a time frame 50 which, in this preferred embodiment, is four time slots long. This is illustrated in FIG. 5. Frame 50 has four transmit slots (TS1-TS4) and four receive slots (RS1-RS4) in length. In operation, the transmit and receive signals are on the same frequency but in different time slots. This type of system is referred to as a TDMA/TDD system, or Time Division Multiple Access/Time Division Duplex type of system.

Returning now to FIG. 1, the communication signals are stored in RAM 12 as set out in FIG. 3. When the data is to be transmitted, an SDMA (Serial Direct Memory Access) function of MPU 13 is used to access the TS1-TS4 data in RAM 12. The SDMA permits the data to be accessed by specifying the beginning address, Y in FIG. 3, and the number of sequential addresses to be accessed, X in FIG. 3. Therefor, the data from Y to Y+X is sequentially output from RAM 12 as a result of one request from MPU 13; rather than having to send separate requests for each data section.

The data series is then passed to an RF (Radio Frequency) transceiver 15 for transmission using antenna 16.

Figure 6:
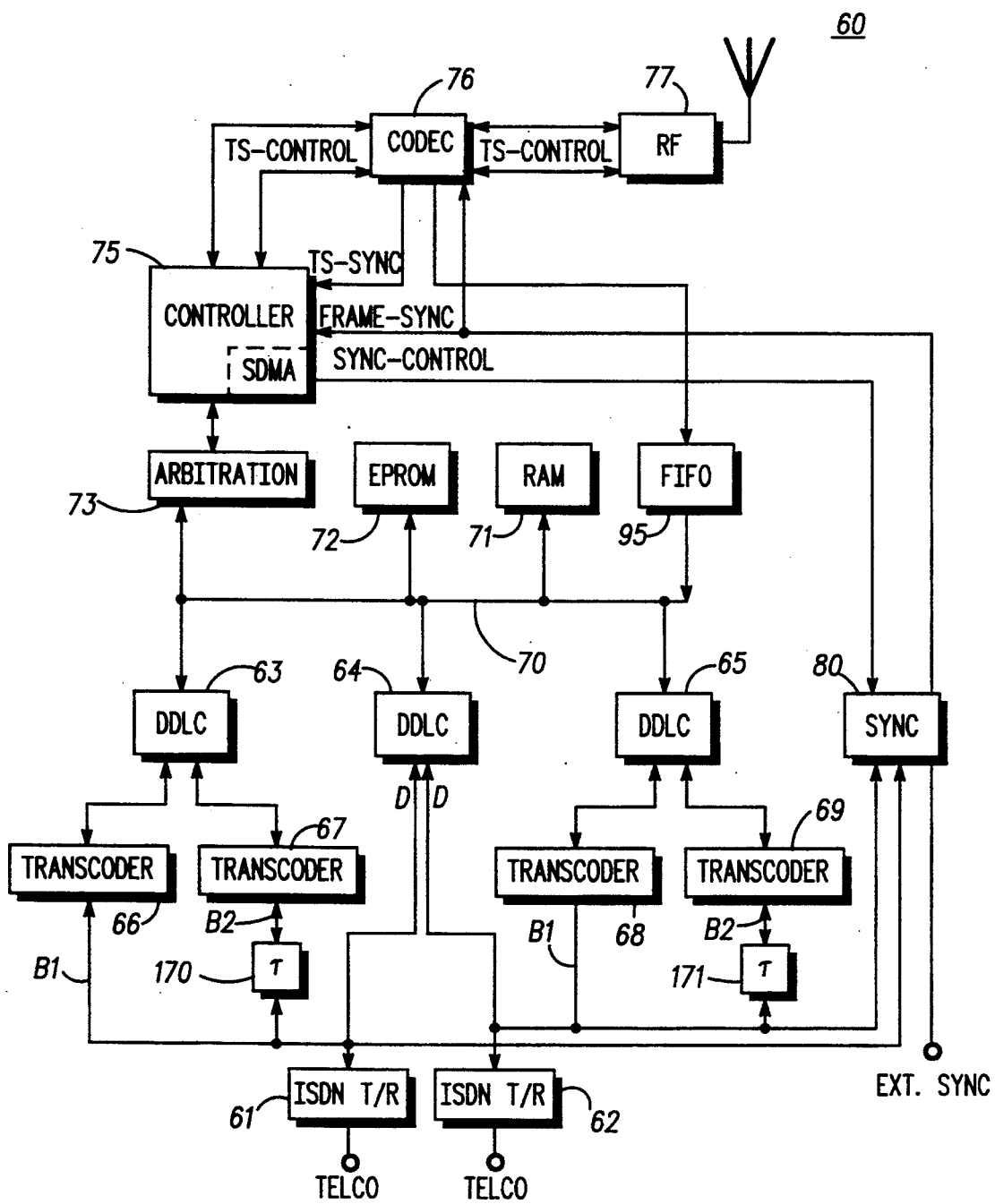
FIG. 6 is a more detailed block diagram of the communication system of FIG. 1.

Turning now to FIG. 6, a more detailed block diagram of a communication system, generally designated 60, embodying the present invention is illustrated. In operation, a pair of network ISDN signals are received at the input/output ports of a pair of ISDN T/R (Transmit/Receive) devices 61 and 62 from a telephone company. An example of these devices is the Motorola Inc. part MC145474. Each of the ISDN signals contains a pair of voice or user data portions (B1 and B2) and a data portion D. The ISDN format signal is converted into an IDL (Interchip Digital Link) format and output from transceivers 61 and 62. The outputs from ISDN devices 61 and 62 are coupled to three DDLC (Dual Data Link Controllers) 63–65 such as the Motorola Inc. MC145488.

The B1 signals are processed through transcoders 66 and 68, such as the Motorola Inc. MC145532, which compress the signals from a 64 kilobits per second size to a 32 kilobits per second size before forwarding them to controllers 63 and 65, respectively. The B2 signals are delayed by synchronization delay circuits 170 and 171, such as the MC14557B manufactured by Motorola Inc. After a delay represented by $\tau$ signals B2 are compressed in transcoders 67 and 69, respectively, before being forwarded to the second inputs of controllers 63 and 65. The D signals from both ISDN T/Rs is transmitted directly to controller 64 without the need of compression since they are not transmitted over the air.

The compressed B1 and B2 signals are then output by controllers 63 and 65 onto a data bus 70. Controllers 63 and 65 act as direct memory access devices to store signal B1 from controller 63 into area 33 of TS1, FIG. 3. Similarly, signal B2 from controller 63 is stored in area 33 of TS2; signal B1 from controller 65 is stored in area 33 of TS3; and signal B2 from controller 65 is stored in area 33 of TS4. In this preferred embodiment, all of the memory areas 32–34 are in RAM 71. Prior to the B1 and B2 signals being stored, the ramp, sync. words, and guard bits have been stored in the appropriate locations of RAM 71.

The D inputs to system 60 are not transmitted directly to users, therefore, they are not stored in RAM 71, but are forwarded, along bus 70, to various other devices of system 60. System 60 also contains an EPROM (Electrically Programmable Read-Only Memory) 72, which contains the executing code for the system; and an arbitration circuit 73 for providing access to bus 70.

Once the voice data has been loaded into RAM 71, a controller 75, such as an MC68302 MPU (MicroProcessing Unit) manufactured by Motorola Inc., directs RAM 71 to serially output the contents of the TS1–TS4 memory areas. This is accomplished with an SDMA (Serial Direct Memory Access) function of controller 75. This function directs RAM 71 to output the data from X serial memory locations beginning at location Y. This results in all of the bits in memory locations TS1–TS4 to be output sequentially onto bus 70. By providing the appropriate number of filler bits (ramp and guard bits), the length of the data output from memory 71 matches the time provided for transmission of signals TS1–TS4.

This data from RAM 71 is then passed through controller 75 to a CODEC (COder/DECoder) 76 where it is encoded for transmission by an RF (Radio Frequency) transmitting means 77. In addition to the data, time slot control (ts_control) information is also passed from controller 75 to CODEC 76 and transceiver 77. Time slot control consists of information such as power, frequency, antenna selection, whether to transmit or receive on the next time slot, etc. Controller 75 also has a ts_sync (time slot synchronization) input from CODEC 76 which is used to initiate time slot control. The time slot sync. is a clock signal operating at 625 $\nu$sec. A frame_sync (frame synchronization) input to control 75 and CODEC 76 is derived from synchronization circuit 80. The frame synchronization signal is a timing signal operating at 5 msec. There is also a sync_control (synchronization control) being provided from controller 75 to synchronization circuit 80. The sync_control operates to select one of the IDL inputs being provided to synchronization circuit 80 from transceivers 61 and 62. The IDL timing signals each operate at 125 $\nu$sec.

Synchronization circuit 80 also has a ext_sync (external synchronization source) input derived from an external timer. If system 60 is the master system, an external timing signal will be provided from synchronization circuit 80. If system 60 is not the master system, an external timing signal will be provide to synchronization circuit 80.

When system 60 is in the receive mode, a signal is received by transceiver 77. The data, and any control information, is decoded in CODEC 76. After being decoded, the control data is transmitted to controller 75 and the voice data is input into a FIFO 95. The data from FIFO 95 is then loaded into one of controllers 63 or 65. From there, the data is decompressed in the appropriate transcoder 66–69 and converted back into an ISDN signal by the appropriate transceivers 61 and 62. The ISDN signal is then forwarded to the telephone company network.

An alternative method to the above described preferred embodiment would use the RAM, if present, which resides on controller 75. This would eliminate the need for RAM 71, but the system would continue to operate in the same fashion.

Therefore, an apparatus has been described which compiles a time division multiplexed signal for transmission by a communication system. This apparatus provides a means of sequentially storing data to be transmitted over an entire frame such that when down loaded from memory, the bits will fill the entire frame. As a result, when the serial bit stream from memory is transmitted, the desired time slot data will fall into the correct time slot without the need for additional timing.

Thus, it will be apparent to one skilled in the art that there has been provided in accordance with the invention, an apparatus which provides a time division multiplexed signal for a communication system which fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A time division multiplexed (TDM) communication system for transmitting a serial signal comprised of a first and a second portion of an input signal, said TDM communication system comprising:

receive means for receiving an input signal;

first compression means for compressing a first portion of said input signal forming a first compressed signal;

second compression means for compressing a second portion of said input signal forming a second compressed signal;

storage means for storing said first and second compressed signals;

transfer means for accessing said storage means and directing said storage means to store said first and second compressed signals in a first and a second time slot area, respectively, of said storage means;

control means for sequentially reading said first and second time slot areas of said storage means forming said serial signal; and transmission means for transmitting said serial signal.

2. The TDM communication system of claim 1 wherein said receive means comprises an integrated services digital network (ISDN) receiver.

3. The TDM communication system of claim 1 wherein said first and second compression means each comprise transcoder compression means.

4. The TDM communication system of claim 1 wherein said transfer means comprises a dual data link controller.

5. The TDM communication system of claim 1 wherein said storage means is a random access memory.

6. The TDM communication system of claim 1 wherein said control means comprises a microprocessor.

7. The TDM communication system of claim 6 wherein said microprocessor comprises a serial direct memory access means.

8. The TDM communication system of claim 1 further comprising an encoding means for encoding said serial signal prior to transmitting.

9. The TDM communication system of claim 1 wherein said first and second time slot areas each comprise:
a first filler portion;
a synchronization word portion;
a data portion; and
a second filler portion.

10. A time division multiplexed (TDM) communication system comprising:
a first transceiver coupled to receive or transmit a network signal, said network signal having first and second communication signals, said first transceiver having a port;
a first transcoder having a first port coupled to said port of said first transceiver and a second port;
a second transcoder having a first port coupled to said port said first transceiver and a second port;
a first dual data link controller having a first port coupled to said second port of said first transcoder, a second port coupled to second port of said second transcoder, and a bus port;
a bus coupled to said bus port of said first dual data link controller;

storage means for storing said first and second communication signals, said storage means having a first port coupled to said bus;

controller means having a first port coupled to said data bus and a data output; and a second transceiver having a data port coupled to said data output of said controller means.

11. The TDM communication system of claim 10 wherein said controller means comprises a microprocessor.

12. The TDM communication system of claim 11 wherein said microprocessor comprises a serial direct memory access means for serially accessing said storage means.

13. The TDM communication system of claim 10 further comprising a delay having a first port coupled to said port of said first transceiver and a second port coupled to said first port of said second transcoder.

14. The TDM communication system of claim 10 further comprising a second dual data link controller having a first port coupled to said port of said first transceiver and a second port coupled to said bus.

15. The TDM communication system of claim 10 further comprising a coder/encoder (CODEC) having a data input coupled to said data output of said controller means, a first control port coupled to a first control port of said controller means, a data port coupled to said data port of said second transceiver, and a second control port coupled to a control port of said second transceiver.

16. The TDM communication system of claim 15 further comprising said controller means having a timing output and a timing means having a first input coupled to a timing output of said controller means, a timing output coupled to said timing input of said controller means and a timing input of said CODEC, and a second timing input coupled to said port of said first transceiver.

17. The TDM communication system of claim 15 further comprising said CODEC having a data output and a register having said data input coupled to a data output of said CODEC and said register having a data output coupled to said bus.

18. A time division multiplexed (TDM) communication system for transmitting a serial signal comprised of a first and a second portion of an input signal, said TDM communication system comprising:

storage means for storing said first and second portions of said input signal;

transfer means for accessing said storage means and directing said storage means to store said first and second portions of said input signal in a first and a second time slot storage area, respectively, of said storage means;

control means for sequentially reading said first and second time slot storage areas of said storage means forming said serial signal; and transmission means for transmitting said serial signal.

* * * * *